United States Patent [19]

Leger

[11] Patent Number: 5,431,936
[45] Date of Patent: Jul. 11, 1995

[54] SYSTEM AND TOWER FOR THE CONTINUOUS PROCESSING OF PROTEINACEOUS PRODUCTS

[76] Inventor: Pierre-Paul Leger, 897 Beauchemin St., Saint-Bruno, Canada, J3V A4

[21] Appl. No.: 198,639

[22] Filed: Feb. 18, 1994

[51] Int. Cl.$^6$ ............................ A23L 1/00; H05B 6/00
[52] U.S. Cl. ........................................ 426/243; 99/355; 99/470; 165/2; 165/61; 426/523; 426/524
[58] Field of Search ............... 426/243, 281, 523, 524; 99/355, 357, 451, 470; 165/2, 61

[56] References Cited

U.S. PATENT DOCUMENTS

| | | | |
|---|---|---|---|
| 2,488,164 | 11/1949 | Bowman | 426/245 |
| 2,953,461 | 9/1960 | Prohaska | 426/523 |
| 3,247,777 | 4/1966 | Kleppan | 99/470 |
| 3,473,465 | 10/1969 | Tonjum | 100/194 |
| 3,640,206 | 2/1972 | Moisescu et al. | 99/470 |
| 4,210,675 | 7/1980 | Liebermann | 99/483 |
| 4,265,922 | 5/1981 | Tsuchiya et al. | 426/520 |
| 4,643,904 | 2/1987 | Brewer et al. | 426/523 |
| 4,644,857 | 2/1987 | Buller-Colthurst | 426/523 |
| 4,699,797 | 10/1987 | Fast | 426/523 |
| 4,994,294 | 2/1991 | Gould | 426/524 |
| 5,008,123 | 4/1991 | Bewley et al. | 426/523 |
| 5,075,120 | 12/1991 | Leary et al. | 426/523 |

FOREIGN PATENT DOCUMENTS

| | | |
|---|---|---|
| 413360 | of 0000 | Canada. |
| 173733 | 12/1916 | Canada. |
| 213648 | 10/1921 | Canada. |
| 921320 | 2/1973 | Canada. |
| 1059830 | 8/1979 | Canada. |
| 1075076 | 4/1980 | Canada. |
| 1258401 | 8/1989 | Canada. |
| 1263271 | 11/1989 | Canada. |
| 1268075 | 4/1990 | Canada. |
| 2018338 | 6/1990 | Canada. |

*Primary Examiner*—George Yeung
*Attorney, Agent, or Firm*—Nixon & Vanderhye

[57] ABSTRACT

Vertically-upright processing apparatus is provided for the continuous processing of proteinaceous food products. The apparatus includes an indirect, preheating heat exchanger surrounding an upper zone of the apparatus, the indirect preheating heat exchanger having a preheating medium inlet and a preheating medium outlet. An indirect cooking heat exchanger surrounds an intermediate zone of the apparatus, such cooking heat exchanger having a cooking medium inlet and a cooking medium outlet. Finally, an indirect cooling heat exchanger surrounds a bottom zone of the apparatus, the indirect cooling heat exchanger having an indirect cooling medium inlet and an indirect cooling medium outlet. The indirect cooling medium outlet is connected to the preheating medium inlet of the preheating heat exchanger.

26 Claims, 2 Drawing Sheets

SYSTEM AND TOWER FOR THE CONTINUOUS PROCESSING OF PROTEINACEOUS PRODUCTS

BACKGROUND OF THE INVENTION (i) Field of the Invention

This invention relates a process and tower for continuously cooking comminuted meats.

(ii) Description of the Prior Art

In the processing of meat, it has been proposed in the past temporarily to use a batch process by enclosing a comminuted meat mixture in a mold while subjecting the mixture to a cooking temperature and thereafter stripping the mold from the product. When such meat was processed according to conventional methods, the application of heat was not uniform throughout the mass. Steam cooking or processing subjected the outer portions of the mass to greater treatment than was applied to the central portion. This was because heat applied at the outside must travel through the outer layers to reach the center of the mass. The necessary temperature gradient to produce rapid travel of the heat tended to result in over-treatment of the outer portions particularly if the processing is to be done expeditiously. In canning of foods, this problem has to some extent been resolved by the retortable pouch technology, by which the thickness of the mass through which heat must penetrate has been dramatically reduced, but this has not generally been applied to the continuous processing of meat. Although there are continuous canning methods in use, by and large, however, canning is still a batch process.

In such cooking of meat products as taught by prior art apparatus, either steam or heated water was utilized as the heat-transferring medium. The steam or heated water that was employed as the heat-transferring medium generally moved by convection, or by pumping means, between a reservoir in which the heat was supplied to the heat-transferring medium by a heater and a radiator by which the heat is transferred from the heat-transferring medium to the food articles that were to be cooked.

In the processing of food products, e.g., meat, poultry, and processed meat, e.g., hams, picnics, pork bellies, luncheon meats and sausages, it was thought to be desirable to establish a chamber with a series of different zones, in which different conditions exist. In the past, it has been usual to move the products gradually and progressively and continuously through the various zones in the chamber. Different zones could provide for air circulation, or water shower or water spray treatments. The air may be either at an elevated temperature or may contain smoke or other treatments, or may be at reduced temperature for chilling. Similarly, the water shower may be at an elevated temperature for cooking, or at reduced temperature for chilling. The atmosphere in the chamber may be tempered or modified by regulating the humidity, or by adding artificial smoke.

However, in this prior art procedure, it was necessary to operate the chamber at preset conditions in the various zones. Consequently, it was only possible to process one type of product at any given time. In order to change products, it was necessary for the product already in the chamber to be completely processed all the way through, which might take several hours, and then, when the chamber was empty, the conditions could be changed to suit a different product. This type of installation involved a very substantial investment in capital. It was therefore suitable only for processing products in very large volumes.

The usual method of preparing ham for sale in square slices, consisted, in the first place, in trimming and removing some, if not most, of the fatty tissue and curing the remaining lean meat. This cured meat was then stuffed into a pliable film bag, vacuum sealed and placed in a stainless steel holder. This holder, which may be of any shape in cross-section, i.e., square or circular, gave the cooked meat product its shape. The pliable film bag was constructed of materials such that the meat can be thoroughly cooked therein. The film bag prevented the loss of meat juices, such juices contribute to the binding of the meat chunks which results in a uniform slice that did not disintegrate during high speed mechanical slicing. The bag served, in the second place, as the product package once removed from the holder after cooking.

The art is replete with processes and apparatus which were intended to provide for the continuous processing of proteinaceous food products. One such patent is U.S. Pat. No. 2,488,164 patented Nov. 15, 1949 to J. Bowman et al, entitled "Method of Processing Meat Products". The patented process included the first step of forming the mass to be treated into a block. The block of meat was confined in a container, opposite walls of which were electrically conductive and lateral walls of which were substantially electrically non-conductive. High frequency current was passed through the block by way of the conductive walls to raise the central part of the block to processing temperature. External fluid pressure was applied to the container to oppose internal fluid pressure generated by the heat developed in the mass. The inner portion of the mass was maintained for a predetermined time at temperatures high enough to effect processing of the inner portion. The container was then cooled and was then subjected to steam, to process the outer portions of the block, and the container was again cooled.

This patent suffers the disadvantage that it must be performed in a "batchwise" manner.

U.S. Pat. No. 2,953,461 patented Sep. 20, 1960 by J. J. Prohaska, entitled "Meat Treating Apparatus and Method" provided a meat treating apparatus and method for processing and partially cooking meat. The patentee disclosed a method including the steps of continuously delivering the comminuted mixture through a forming horn while simultaneously subjecting the mixture to a high frequency current to produce at least an initial set in the meat mixture. When the mixture formed as above-described passed from the exit end of the forming horn, it was severed into equal length links, which could then be disposed upon a conveyor to be carried through any further processing needed. The patented apparatus included a tube, which was formed of an electrical non-conductor, which had an inlet, an outlet, and a smooth interior surface. Means were provided for filling and continuously feeding a comminuted meat product into the tube. Means were provided for surrounding the confines of the tube. The surrounding means extended lengthwise along the tube a sufficient distance to produce the required degree of heating for a sufficient length of time to produce at least a partial cooking and an initial set in the comminuted meat product as it passed from the inlet to the outlet.

While this patent disclosed a method and apparatus for the continuous processing of meat, there was no disclosure of the cooling of the meat after the meat was cooked.

U.S. Pat. No. 3,247,777 patented Apr. 26, 1966 by O. Kleppan, entitled "Apparatus for Continuous Predrying, Smoking, Boiling and Cooling of Edibles, Particularly Sausages" provided an apparatus for continuously predrying, smoking, steam cooking and cooling sausages. The patented apparatus included a vertically-elongated, substantially-closed casing, having a plurality of partitions dividing the casing into vertically-elongated compartments, namely an access compartment, a drying compartment, a smoking compartment, a steam cooking compartment, and a cooling and washing compartment. Adjacent ones of the compartments intercommunicated with each other through relatively small passageways to minimize mixing of gases between adjacent compartments. A continuous endless conveyor was provided for holding the sausages passing through all of the compartments. Means were provided for driving the conveyor to cause the sausages to pass sequentially at a constant speed through the compartments. The conveyor passed through the access compartment for loading the sausages on the conveyor and for removing the same therefrom after treatment. Guideways were provided for guiding the conveyor upwardly and then downwardly through the drying compartment for guiding the conveyor through the smoking compartment, for guiding the conveyor up into and then down from the steam cooking compartment, for supplying steam to the steam compartment, and for guiding the conveyor through the cooling and washing compartment. A conduit was provided for supplying hot dry air to the drying compartment. Ducts were provided for supplying gases to the smoking compartment for smoke treatment of the sausages. A smoke outlet was provided at the top of the drying compartment for simultaneously venting the hot air and the gases, so that the hot air was prevented from entering the smoking compartment. Means were provided for injecting a water spray into the cooling and washing compartment.

While this patent taught continuous processing of meat, it suffered the disadvantage that the heating was by direct gaseous contact, with its consequent difficulty of control.

U.S. Pat. No. 3,473,465 patented Oct. 21, 1969 by J. A. Tonjum, entitled "Apparatus for Pressing and Smoking Meat" provided an apparatus for compressing and smoking chunks of meat, e.g., ham. The patented apparatus included a plurality of similar article-supporting units which were interconnected together for movement between expanded and collapsed conditions. Each article-supporting unit or rack was arranged and constructed to cooperate with other racks effectively to compress the ham prior to smoking. Mechanism was provided which was engageable with the racks to compress the racks and also which was operable to elevate the racks to an expanded suspended position for ready transfer of the trolley which supported the racks to a track, so that the racks may be moved through a smoking chamber.

While this patent taught continuous processing of meat, it only taught the compressing of the ham prior to smoking.

U.S. Pat. No. 4,210,675 patented Jul. 1, 1980 by B. E. Liebermann, entitled "Method of Transferring Heat to Food Articles" provided a method of, and an apparatus for, transferring heat to food particles. The patented method included the step of supporting food articles on a support located within a chamber, and forcing a heated liquid heat-transferring medium through a heat exchanger located adjacent to the support. The cooked meat was stored in a chamber having a closure intended to be repeatedly and frequently opened and closed. The cooked meat food articles were supported on a support located within the chamber. A heated liquid heat-transferring medium was forced through a radiator located adjacent to, and on opposite sides of, the support. The humidity within the chamber was maintained above that of the atmosphere outside of the chamber.

The patented apparatus included a chamber, and a support for supporting food articles within the chamber. A reservoir was provided for containing a liquid heat-transferring medium. A heater was provided for heating the liquid medium contained in the reservoir. A radiator was provided which was located adjacent to the support means. Hollow conduits were provided to connect fluid in the reservoir and with fluid in the radiator. A pump was provided for circulating the liquid medium between the reservoir and the radiator. Controls were provided which were connected to the heater for controlling the temperature to within $\pm 5°$ F. of the desired temperature to which the liquid medium was to be heated and maintained by the heater.

While this patent disclosed a method and apparatus for the continuous processing of meat, there was no disclosure of the cooling of the meat after the meat was cooked.

U.S. Pat. No. 4,265,922 patented May 5, 1981 by T. Tsuchiya et al, entitled "Induction Heating Method for Processing Food Material" provided for the treating or processing of food materials under heat and pressure. The patented method included the step of introducing food material into one end of a metallic barrel, and discharging the food material from the other end of the barrel while rotating the barrel. At least a portion of the barrel was inductively heated at a relatively low frequency as it rotated so that heat was first induced in the barrel and was then transmitted by conduction from the barrel into the food material as the food material passed through the barrel. The barrel was rotated within a pair of solenoid-type coils to provide the inductive heating by individually energizing the coils. The temperature of the outer surface of the barrel was sensed at two longitudinally-spaced locations as the barrel rotated and each of the two induction coils was individually controlled in accordance with the temperature that is desired. The coil nearer the discharge end could be energized with more current than the other coil, thereby permitting the discharge end of the barrel, where there was more food material, to be heated to a greater degree than the inlet end.

While this patent taught continuous processing of meat, it suffered the disadvantage that there was no teaching of the cooling of the cooked meat.

U.S. Pat. No. 4,644,857 patented Feb. 24, 1987 by G. E. Buller-Colthurst, entitled "Food Processing Chamber" provided a processing apparatus which included a chamber defining a plurality of chamber zones. Predetermined processing conditions were provided in different chamber zones. A continuous conveyor extended through the chamber zones and defined a single conveyor axis. Unit supports were supportable on the conveyor at spaced intervals, for moving units through the chamber zones. Unit movement devices were operable in steps at predetermined time intervals to move a first unit along the axis of the conveyor at predetermined first time intervals and to move a second unit along the same axis of the conveyor at predetermined second time intervals. Engagement devices were selectively inter-engageable between the unit supports and the movement devices whereby a unit support could be engaged and moved either at first, or at second time intervals. Controls were provided to control the movement devices for selective timed operation.

While this patent disclosed a method and apparatus for the continuous processing of meat, there was no disclosure of the cooling of the cooked food after the food was cooked.

U.S. Pat. No. 4,994,294 patented Feb. 19, 1991 by B. Gould, entitled "Temperature Controlled Food Processing Apparatus and Method" provided an apparatus for processing food products including a rotatable container mounted on a frame structure. The apparatus included spiral fins which were disposed in the interior of the container for imparting movement to the food products along an axis of rotation of the container when the container was rotated about the axis of rotation. A temperaturecontrolling fluid was introduced into contact with the spiral fins to effect heat transfer between the fin surface area and the food products without direct contact between the food products and the temperature-controlling fluid. This controlled the temperature of the food processing operation.

While this patent taught continuous processing of meat, it suffers the disadvantage that there was no teaching of the compression of the meat while it was being continuously cooked.

U.S. Pat. No. 5,008,123 patented Apr. 16, 1991 and its corresponding Canadian Patent Application Serial No. 2,018,338 published Dec. 15, 1990 by D. R. Bewley et al, entitled "Food Processing Method" provided a method for cooking meat in a sealed cooking vessel. The patented method included introducing meat into a mobile cooking vessel and sealing the meat-containing vessel from the atmosphere. A stock liquor was heated with a heat exchanger to a cooking temperature of at least 60° C. and the heated stock was circulated liquor through the vessel and through the heat exchanger for a period of time sufficient to heat the meat to a cooking temperature and to cook the meat. After cooking the meat, the circulating stock liquor was cooled with the heat exchanger to a temperature suitable to cool the cooked meat to a temperature of no more than 15° C. within 45 minutes.

While this patent taught the processing of meat, it suffered the disadvantage that the processing was batchwise, with its consequent difficulty of maintaining high productivity.

U.S. Pat. No. 5,075,120 patented Dec. 24, 1991 by S. G. Leary et al, entitled "Method of Cooking a Food Product in a Process Vapour at Progressively Varying Rates", provided a method for cooking food in an oven. The patented method included passing food products into the housing upon a conveyor of generally permeable construction. A cooking process vapour was applied to the food products in a first cooking zone, the cooking process vapour being circulated parallel to the path of conveyor movement. The food product was moved from the first cooking zone to a second cooking zone. A cooking process vapour was applied thereon to the food product in a direction laterally of the path of conveyor movement. The cooking process vapour was then moved in a direction parallel to the path of conveyor movement. The cooking process vapour was then reheated in the second zone separately from reheating the cooking process vapour in the first cooking zone.

While this patent disclosed a method and apparatus for the continuous processing of food, there was no disclosure of the cooling of the food after the food was cooked.

Canadian Pat. No. 173,733 patented Dec. 12, 1916 by G. N. Luhrmann et al, entitled "Apparatus for Processing or Treating Foods" provided an apparatus and method for the maintenance, within a retort, of any require definite temperature and pressure that may be necessary with any particular food. It also provided an adjustment device so that any particular relation between pressure and temperature could be predetermined and provided for. The meat was cooked in the retort by steam and by compressed air in direct contact with containers containing the meat in the retort. After cooking, the meat in the containers was cooled by warm water (which has been warmed by contact with waste steam) and cold air.

While this patent taught continuous processing of meat, it suffered the disadvantage that the heating was of canned meats and was by direct air/steam contact, with its consequent difficulty of control.

Canadian Pat. No. 413,360, patented Jun. 22, 1943 by S. L. Komarik, entitled "Production of Canned Ham" provided a procedure for the cooking of raw ham while the ham was in a sealed can. The method included the first step of heating the can from a chill temperature of about 40° F. by exposing the ham to a temperature of 115° to 120° F. until the coldest part of the ham attained a temperature of 90° to 95° F. The next step involved heating the can by exposing it to a cooking temperature upwardly from 190° F. for 35 to 40 minutes less about ½ minute for each degree over 190° F. The temperature was at least 20° F. higher than the temperature to which the can was later heated. Finally the can was heated by exposure to a temperature which was not over 180° F. but was not under 165° F. until the coldest part of the ham attains a temperature in the range from 152° to 160° F.

While this patent disclosed a method and apparatus for the processing of meat, it suffered the disadvantage of cooking within a sealed can.

Canadian Pat. No. 921,320, patented Feb. 20, 1977 by E. H. Cornwell, "Coagulated Chunks in Canned Meat" provided a continuous method for preparing coagulated meat chunks which were automatically surrounded by the congealed fats and meat juices. The first step in this continuous process was comminuting fresh meat to a cross-section of between 1/16 to ¾ inch. The next step involved continuously forcing the coarsely comminuted meat through a forming zone thereby compacting each meat particle into intimate contact with the other surrounding meat particles. At the same time as the meat was compacted, it was heating to an internal temperature of at least 120° F. from a heat source which surrounded the forming zone for a time sufficient to coagulate the meat proteins. The next step involved reducing the coagulated meat to a desired particle size. The next step involved mixing the coagulated meat particles with the liquid fat and meat juices which had been separated during the coagulation step. The final step involved chilling the mixture to congeal the liquid fats and juices about the coagulated meat particles in substantially the same ratio as a fresh meat.

While this patent disclosed a method and apparatus for the continuous processing of meat, it suffered the disadvantage of rapid heating to a cooking temperature, followed by rapid cooling to a cool temperature.

Canadian Pat. No. 1,059,830, patented Aug. 7, 1979 by A. Borsuk, entitled "Method and Apparatus for Continuously Making Meat Loaf" provided a method and an apparatus for continuously making a loaf meat product from a stuffable meat material. In the method, magazines of molds were incrementally and sequentially advanced in a closed loop through release agent application, cooking, chilling, knockout and wash stations. A magazine was periodically removed from the closed loop downstream from the release agent application station and was advanced to the stuffing station which was outside the closed loop. At the stuffing station, the molds in the magazine were stuffed with a meat material in loaf form. The magazine was then reinserted into the closed loop upstream of the cooking station.

While this patent disclosed a method and apparatus for the continuous processing of meat, this patent suffered the disadvantage of cooling the meat after the meat was cooked.

Canadian Pat. No. 1,258,401 patented Aug. 15, 1985 by M. Mette, entitled "Apparatus for Continuously Cooking and/or Dehydrating Foodstuffs" provided an apparatus for continuously processing foodstuffs. The apparatus included a preheating zone, a boiling zone and a recooking zone. Each of the zones was arranged separately and had an inlet region and an outlet region. Troughs were installed in each zone. Each zone, moreover, was provided with chambers and was traversed by means for conveying the foodstuffs. A device was provided for introducing hot water to the outlet region of the recooking zone. Another device was provided for removing the water from inlet region of the preheating zone. A heat exchanger was provided for transferring the thermal energy to the water. The inlet region of the recooking zone was connected with the outlet region of the preheating zone by a pipe. A feed pump was intermediately arranged as the means for supplying the water. The feed pump was controlled in accordance with the supply quantity of the water into the recooking zone. A heat exchanger was installed in the boiling zone introducing the water.

While this patent disclosed a method and apparatus for the continuous processing of meat, there was no disclosure of the continuous cooling of the cooked meat.

Canadian Pat. No. 1,263,271 patented Nov. 28, 1989 by P. Choquette, entitled "Process and Apparatus for Cooking and Shaping Meat Slabs" provided a process and an apparatus for cooking and shaping a precut meat piece. The process included the first step of placing an uncooked meat piece adjacent an inlet of a combined shaping mold, and cooking vessel. Then, an air pressure differential was established between the inside and the outside of the shaping mold for driving the meat piece in the shaping mold. Heat was then applied to the meat piece for cooking the meat piece. The apparatus included a shaping mold having an inlet. The combined shaping mold cooking vessel, was adapted to receive an uncooked meat piece. Means were provided in operative relation with the shaping mold to establish an air pressure differential between the inside and the outside of the shaping mold for driving an uncooked meat piece placed adjacent the inlet into the shaping mold. A heater was provided to apply heat to the shaping mold for cooking the meat piece.

While this patent taught continuous processing of meat, it suffered the disadvantage that the cooking was batchwise in an individual mold.

SUMMARY OF THE INVENTION

Aims of the Invention

None of the above-described patents provided a commercially-feasible, continuous process and apparatus for cooking comminuted meats to provide cooked-cured amalgamated meat products.

There has also been a need for an approach to the processing of food products which would minimize shrinkage and, at the same time, would maximize flavour and succulence, avoid crusting and particularly, which would secure uniformity of treatment and appearance, both throughout its body, as well as from the standpoint of its opposed flat sides. This was particularly true for ham.

It is therefore an object of the present invention to provide a system which can distribute either a cooling fluid or a heating fluid about a food processing apparatus for the indirect heating or cooling of the food therein, to provide more efficient processing of the food product.

It is a further object of the invention to apply heat at adequate temperatures and in adequate quantity either successively or simultaneously, by heat exchange means, whereby the meat receives uniform heating treatment.

Another object of the invention is to provide an apparatus for cooking food products in a plurality of cooking zones, each separately controllable as to the temperature therein.

Another object of the invention is to provide a process which is highly energy efficient for cooking food products at progressively varying rates of heat transfer to the food product.

Another object of the invention is to improve the cooking procedure and to improve the flavour of a cooked ham produced by splitting the total heating period into a non-cooking heating period and a cooking period.

It is a further object of the present invention to provide a continuous method for processing meat wherein the food product is additionally processed in a chilling station ultimately to provide a product having a uniform characteristic.

Another object of the present invention is to provide a continuous process which will enable the utilization of heat exchange fluid in a highly efficient and effective manner to attain a uniform, full, heat treatment or processing of a food product during its continuous movement through a processing chamber.

It is yet a further major object of the invention to enable that the process be performed automatically with a view to minimizing operating costs.

Statement of Invention

This invention is directed to a continuous method and cooking tower for preparing meats having a distinctly improved texture from comminuted meats. The superior meat texture results from the simultaneous compacting of the coarse ground meat and the coagulation of the meat proteins. The improved texture of the final meat product is an end product having improved texture at a substantial savings in time and other production costs.

The present invention provides a vertically-upright processing apparatus for the continuous processing of food products, the apparatus comprising: an indirect preheating heat exchanger surrounding an upper zone of the apparatus, the preheating heat exchanger having a preheating fluid inlet and a preheating fluid outlet; an indirect cooking heat exchanger surrounding an intermediate zone of the apparatus, the cooking heat exchanger having a cooking fluid inlet and a cooking fluid outlet; and an indirect cooling heat exchanger surrounding a bottom zone of the apparatus, the cooling heat exchanger having an indirect cooling fluid inlet and an indirect cooling fluid; indirect outlet, the cooling fluid outlet the being connected to the preheating fluid of the preheating heat exchanger.

This invention also provides a continuous cooking apparatus comprising: a vertically-upright processing chamber; a first indirect pre-heating heat exchanger surrounding a top zone of the chamber, such heat exchanger having a first heating medium inlet and a first medium outlet; a second indirect heating heat exchanger surrounding an upper zone of the processing chamber, such upper zone abutting and being below, the top zone, such second heat exchanger having a second heating medium inlet and a second heating medium outlet; a third indirect heating heat exchanger surrounding an intermediate pre-cooking zone of the processing chamber, the intermediate pre-cooking zone abutting, and being below, the upper zone, such heat exchanger having a third heating medium inlet and a third heating medium outlet; a first indirect cooling heat exchanger surrounding a lower zone of the processing chamber, such lower zone abutting and being below the intermediate zone, the first indirect cooling heat exchanger having a first cooling medium inlet and a first cooling medium outlet, such first cooling medium outlet being connected to the second heating medium inlet at the upper zone; and a second indirect cooling heat exchanger surrounding a bottom zone of the processing chamber, such bottom zone abutting and being below, the lower zone, the second indirect cooling heat exchanger having a second cooling medium inlet, and a second medium outlet, such liquid outlet being connected to the first heating liquid inlet of the first indirect pre-heating heat exchanger.

The present invention also provides a continuous process for cooking proteinaceous food in an vertically-upright processing tower, including continuously feeding the food downwardly in the tower through a plurality of contiguous sections, comprising: feeding the proteinaceous food through a preheating section of such tower where it is preheated from a temperature of about 4° C. to a temperature of about 40° C. by indirect heat exchange using influent preheating heat exchange medium and providing effluent preheating heat exchange medium; feeding the preheated proteinaceous food through a cooking section of such tower, where the food is cooked from a temperature of about 40° C. to a temperature of about 75° C. by indirect heating heat exchange using influent cooking heat exchange medium and providing effluent cooking heat exchange medium; and feeding the cooked proteinaceous food through a cooling section of such tower where it is cooled from a temperature of about 75° C. to a temperature of about 2° C. by indirect cooling heat exchange using influent cooling heat exchange medium and providing effluent cooling heat exchange medium.

The present invention also provides a continuous ham cooking procedure comprising: dumping boneless, skinless, substantially fat-free ham into a bulk conveyor; conveying the hams to a multi-needle curing pickle injector; feeding the hams from the multi-needle curing pickle injector to a continuous tumbler; feeding the hams from the continuous tumbler to a feeding rubber screw conveyor; and feeding the cured uncooked hams to a vertically-upright processing apparatus, the vertically-upright processing apparatus being the one as described above in all the features described.

(iii) Features of the Invention

By one feature thereof, the apparatus includes a microwave apparatus at the pre-cooking intermediate zone.

By another feature thereof, the apparatus includes complementary electrical heating means at the intermediate pre-cooking zone.

By another feature thereof, the apparatus includes complementary electrical heating means at the intermediate pre-cooking zone and also complementary steam heating at the intermediate pre-cooking zone.

By still other features thereof, the apparatus includes an extrusion feed to introduce product to be cooked into the chamber; and/or a screw feeder to feed products to be cooked into the chamber; and/or a paddle-type device to feed products to be cooked into the chamber.

By still another feature, the apparatus includes severing means to cut emerging from the processing apparatus cooked products to a predetermined length, preferably a guillotine knife.

By yet another feature, the apparatus includes a conveyor to move predetermined length cut, cooked products to a packaging station.

By still another feature, the cross-section of the chamber is round, square or rectangular or any other desired cross-sectional shape.

By a still further feature, the apparatus includes a plurality of vertically-upright processing chambers.

By one feature of this invention, the influent preheating indirect heat exchange medium which provides the heat for the preheating step is the effluent cooling heat exchange medium from the indirect cooling heat exchanger. Preferably such heating influent heat exchange medium is brine or glycol.

By another feature of the process, the cooling section includes an upper abutting precooling section wherein cooked food product is cooled from a temperature of about 75° C. to a temperature of about 30° C. by indirect cooling heat exchange. Preferably the cooling influent heart exchange medium is cold water.

By yet another feature of the process, the cooking section includes a precooking section where preheated food products are heated from a temperature of about 40° C. to a temperature of about 65° C. by microwave heating.

By still another feature of the process, the preheating section includes a second preheating section where preheated food products are preheated from a temperature of about 20° C. to a temperature of about 40° C.

By yet a further feature of the process, the preheating section includes a second preheating section where preheated food products are preheated from a temperature of about 20° C. to a temperature of about 40° C.

By a still further feature of the process of this invention, the cooling section includes an upper abutting pre-cooling section wherein cooked proteinaceous food is cooled from a temperature of about 75° C. to a temperature of about 30° C. by indirect cooling heat exchange, and the preheating section includes a second preheating section where preheated proteinaceous food is preheated from a temperature of about 20° C. to a temperature of about 40° C. Preferably the effluent cooling heat exchange medium from the precooling section is the influent pre-heating heat exchange medium for the preheating section.

By another feature of the process, cooking in the cooking section is abetted by complementary electrical and/or steam heating from a temperature of about 65° C. to a temperature of about 75° C.

By still another feature of the process, the process includes the step of forcing the proteinaceous food products to be cooked into the upright processing tower.

By another feature of the process, the process includes the step of cutting the cooled cooked proteinaceous food emerging from the processing apparatus into predetermined lengths.

Generalized Description of the Invention

Thus, as described above, the present invention is directed toward the provision of a novel method of, and an apparatus for, transferring heat to proteinaceous food products, and which can also be employed initially to cook such food products or to complete the cooking of such food products which may have been previously partially cooked.

Also as described above the present invention also provides a continuous meat cooking apparatus in which there are a plurality of treating zones. The first zone is a pre-heating section heated to a temperature of about 4° C. to about 20° C. preferably using brine or glycol coming from the sixth zone. The second zone is a second pre-heating section heated to a temperature of about 20° C. to about 40° C. preferably using warm water coming from the fifth zone. In another embodiment, the first and second zones can be combined.

The third zone is a pre-cooking section heated to a temperature of about 40° C. to about 65° C.

The fourth zone is a cooking section heated to a temperature of about 65° C. to about 75° C. In another embodiment, the third and fourth zones can be combined.

The fifth zone is a pre-cooling section cooled to a temperature of about 75° C. to about 30° C., preferably using cold water.

The sixth zone is a final cooling zone cooled to a temperature of about 30° C. to about 2° C. preferably using brine or glycol. In another embodiment, the fifth and sixth zones can be combined.

The interior coating of the tower is a self lubricating material, e.g., the polytetrafluoroethylene known by the trade-mark TEFLON TM.

Optionally, an extruding infeeding device may be provided. Still further optionally, a screw or paddle infeeding pushing device may be provided.

At the exit of the tower, the mass of processed meat is cut to the desired length, e.g., with a guillotine knife and the cut pieces are conveyed to conventional packaging means.

The heating and cooling are carried out indirectly using heat exchangers. The heat for the first zone is provided by coolant which enters at the bottom of the sixth zone and is heated by the cooling step in the sixth zone to be conveyed as heated liquid to the first zone, where it is removed to be recycled.

The heat for the second zone is provided by cold water which enter at the bottom of the fifth zone and is heated by the cooling step in the fifth zone to be conveyed as heated water to the second zone where it is removed to be recycled.

The heat for the fourth zone is provided by steam entering at the bottom of the fourth zone and being removed and the top of the fourth zone.

BRIEF DESCRIPTION OF THE DRAWINGS

In the accompanying drawings.

DESCRIPTION OF THE DRAWINGS

Figure 1:
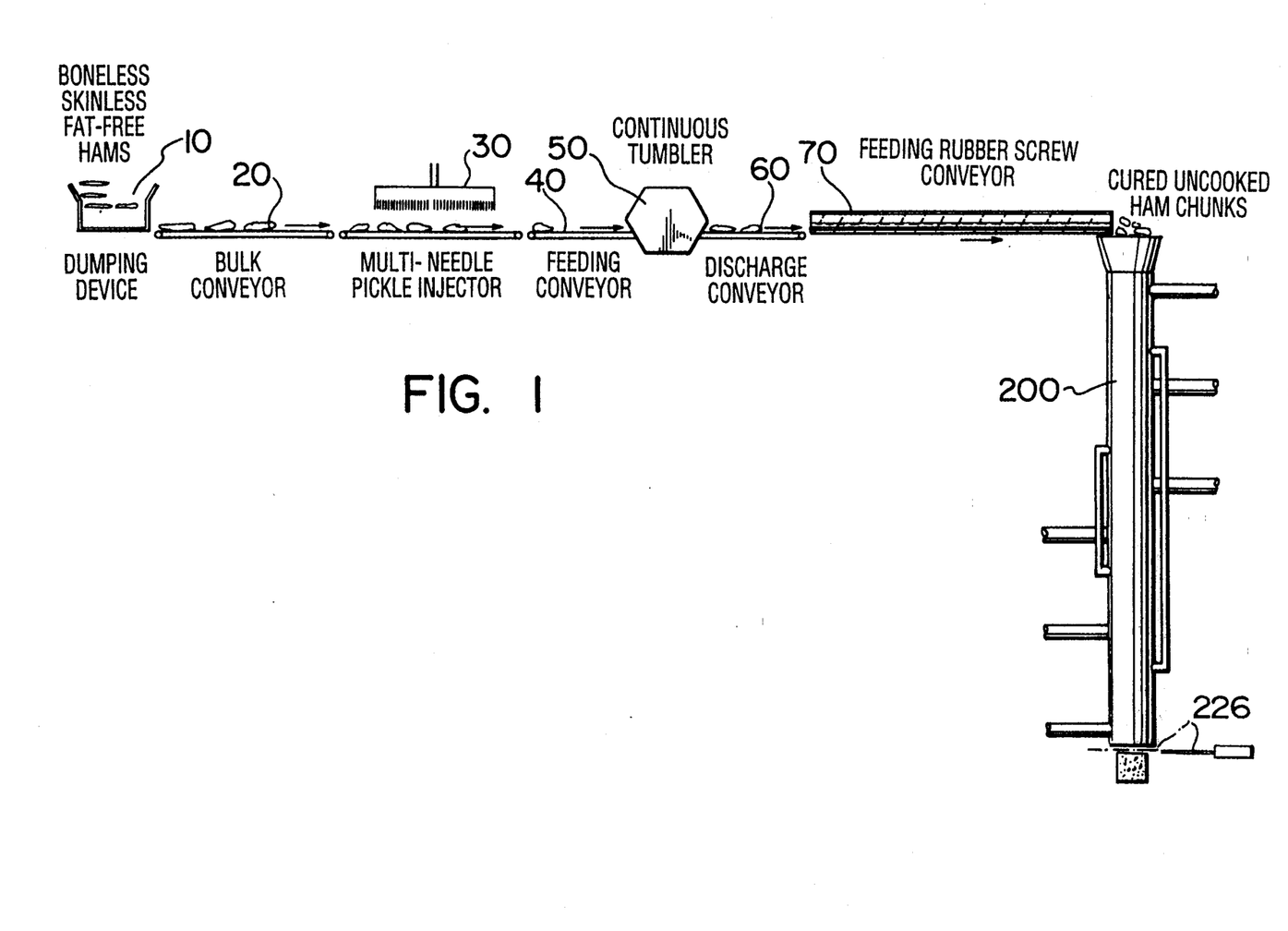
FIG. 1 is a schematic flow chart of a continuous ham making processing system.

Description of FIG. 1

As seen in FIG. 1, a dumping device 10 is provided to receive boneless, skinless, fat-free hams and load them into a bulk conveyor 20. The bulk conveyor 20 passes the hams to a multi-needle pickle injector 30 of conventional structure. A feeding conveyor 40 receives the discharged hams from the multi-needle pickle injector 30 and passes them to a continuous tumbler 50 of conventional structure.

A discharge conveyor 60 is provided to receive the discharge from the continuous tumbler 50 and feed it to a rubber screw conveyor 70 of conventional structure. The rubber screw conveyor feeds the cured uncooked ham chunks to the continuous cooking tower 200 of one embodiment of this invention. While not shown, the top of the continuous cooking tower 200 may be provided with an extrusion device to force the cured uncooked ham chunks from the rubber screw conveyor 60 into the cooking tower 200. Instead of, or in addition to, the extrusion device, a paddle pushing device may be provided to assist in feeding the cured uncooked ham chunks into the cooking tower 200.

Figure 2:
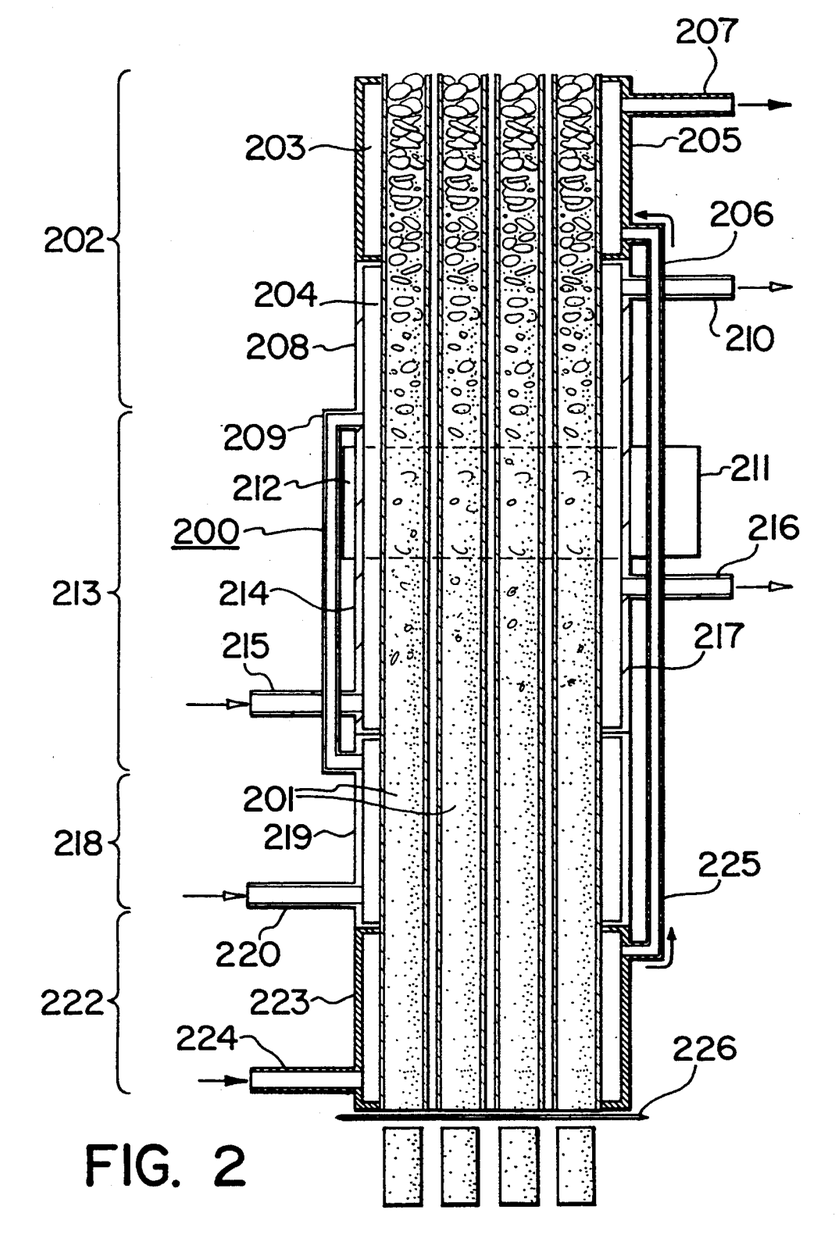
FIG. 2 is a schematic view of a continuous meat cooking tower according to one embodiment of the invention.

Description of FIG. 2

As seen in FIG. 2 the continuous meat processing tower 200 includes at least one vertical processing tower 201, or a plurality, e.g., four integrated vertical processing towers 201. The towers 201 are provided with an interior coating which is of a self-lubricating material, e.g., the polytetrafluoroethylene known by the trade-mark TEFLON TM. The precise physical nature of the material used in making up the lining in this processing tower is not important in the present invention but it should have some lubricating properties. Material suitable for this purpose include thermoplastic resins, e.g., medium density polyethylene, polypropylene, polystyrene, and, as noted above, a polyfluorinated hydrocarbon sold under the trademark "TEFLON TM" and cellulose acetate butyrate.

The towers 201 include a preheating zone 202. This preheating zone may be provided as two contiguous zones 203, 204. Preheating zone 203 is enveloped by indirect contact exchange preheating heat exchanger 205, having a liquid inlet line 206 and a liquid outlet line 207. Preheating zone 204 is enveloped by indirect contact second preheating heat exchanger 208 having a liquid inlet line 209 and a liquid outlet line 210.

The tower 201 includes a contiguous pre-cooking zone 211 which is enveloped by a micro-wave cooking apparatus 212.

The tower 201 also includes a contiguous cooking zone 213 which is enveloped by an indirect contact cooking heat exchanger 214, having a liquid inlet line 215 and a liquid outlet line 216. The cooking zone 213 also may be provided with an optional enveloping electrical heater 217 and/or steam heater 217.

The tower 201 also includes a contiguous precooling zone 218 provided with an indirect contact vertically-discontinuous pre-cooking heat exchanger 219, having a liquid inlet line 220, and a liquid outlet in the form of a by-pass line 221 leading to the inlet line 209, heat exchanger 208. Heat exchanger 219 is thus provided with an outlet line 221 which feeds heat exchanger 208 and hence the outlet line for heat exchanger 219 is line 210.

The tower 201 also includes a final cooling zone 222 provided with an indirect contact heat exchanger 223 provided with an inlet line 224, an outlet leading to a by-pass line 225 which feeds heat exchanger 205. Accordingly, the outlet line from heat exchanger 223 provides the inlet line to feed heat exchanger 205 and the outlet line from heat exchanger 223 is outlet line 206.

The outlet of the tower 201 may be provided with a forming horn (not seen) which is a curved elbow to facilitate discharge of the formed loaves of ham. The loaves of ham are cut to the desired length by a guillotine knife 226 and are conveyed by a conveyor (not shown) to conventional packaging means (not shown).

There may be one or more such cooking unit, the number of cooking units depending upon flow and varieties required. Each tube can be round, square, rectangular or any cross-sectional shape desired.

Operation of Preferred Embodiment

In operation, cured, uncooked ham chunks are fed from the feeding rubber screw conveyor 70 to the inlet upper end of the continuous meat cooking tower 200. At the preheating zone 203, which is heated by means of indirect heat exchange in heat exchanger 205 fed with warm brine or ethylene glycol coolant originating at the cooling heat exchanger 223, the ham is preheated from a temperature of about 4° C. to a temperature of about 20° C.

The preheated ham then passes downwardly to the contiguous second preheating zone 204. Zone 204 is heated by means of indirect heat exchanger 208, which is fed with warmed water at inlet 220, which has been heated while cooling hot ham which was cooked by steam entering heat exchanger 214 via line 215. The thus-warmed water in line 221 provides the inlet at 209 to the heat exchanger 208. At this second pre-heating zone 204, the ham is preheated from a temperature of about 20° C. to a temperature of about 40° C.

The ham then passes downwardly to the contiguous pre-cooking zone 211 and cooking zone 213. In the pre-cooking zone 211, a microwave cooking apparatus 217 pre-cooks the ham from a temperature of about 40° C. to a temperature of about 65° C.

The ham then passes downwardly into a contiguous cooking zone 213 where it is cooked from a temperature of about 65° C. to a temperature of about 75° C. by indirect heat exchanger 214 fed with steam entering at inlet 215 and emerging at outlet 216. Complementary heating may be provided by electrical heaters and/or additional steam heaters 217.

The cooked ham then passes downwardly into a contiguous pre-cooling zone 218 where it is cooled by indirect heat exchanger 219 fed with cool water entering at inlet 220 and emerging at by pass line 221 as warm water. The ham is thus cooled from a temperature of about 75° C. to a temperature of about 30° C.

The partially-cooled ham then passes downwardly into a contiguous final cooling zone 222, where it is cooled by coolant brine or glycol entering at inlet 224 and emerging as warm coolant at bypass line 225. The ham is cooled from a temperature of about 30° C. to a temperature of about 2° C.

The cooled, formed, fully cooked ham then emerges from the continuous meat cooking tower 200. Preferably, although not shown, the outlet is a forming elbow to enable the guillotine knife 226 to operate in a horizontal plane rather than in the vertical plane, as schematically shown. Also, such change of direction from vertical to horizontal facilitates the feeding into a conventional conveyor (not shown) to conventional packaging (also not shown).

Generalized Description

The development of heat internally of the meat to be cooked is brought about by the use of indirect heat exchangers. The meat while undergoing the cooking is contained in the continuous meat cooking tower of the present invention to maintain form, and is under suitable pressure to avoid air spaces in the meat, which would tend to yield a non-uniform, unsightly product.

The continuous meat cooking tower may be connected to an outlet forming horn which is adapted to convey and shape the meat mixture as it is forced therethrough. The forming horn is preferably constructed to have a passage for the meat of approximately the same cross-sectional area or slightly smaller area than the cross-sectional area of the tower, the passage of the horn being of uniform cross-section. The inside walls of the passage against which the product rubs during its passage therethrough should be relatively smooth. The forming horn may be detachably connected to the tower by well-known means, so that, in effect, the forming horn preferably provides a continuation of the continuous meat cooking tower. The forming horn is, in accordance with the teaching of this invention, provided with a lining of a suitable low friction material, e.g., TEFLON TM.

The heat exchangers used in the carrying out of the invention is preferably a plate heat exchanger. When the heat exchanger is used to cool the product, it is conveniently cooled by chilled water and then by cold brine or ethylene glycol.

The heating up to the cooking temperature, which is taken as the centre temperature of the meat pieces, usually takes from about 15 to 45 minutes, preferably from 20 to 30 minutes. The cooking is conveniently carried out for a period of from 5 to 60 minutes depending upon the type of meat and the size of the meat pieces. The cooking temperature depends on the type of meat used, but is usually from about 60° C.±5° C. to 75° C.±5° C.

Sequentially after the cooking step, the meat is cooled to below 15° C. and preferably below 10° C. within 45 minutes, e.g., to from about 30° C. down to about 2° C.

The processing of food and food products frequently involves massaging and tumbling operations and these are carried out, according to this invention, prior to the continuous cooking operation. These operations are particularly effective with meats, e.g., cured hams, ham products, bacon bellies, corned beef briskets, beef round, roasts, turkey breasts and other poultry products. When applied to meat products which have been injected with, or otherwise subjected to, curing brine, tumbling and massaging accelerates the curing process while facilitating the distribution of the curing ingredient throughout the meat. The salt-soluble "binding" protein myosin is also extracted during tumbling in brine. Extraction of myosin from a meat product produces a sticky meat surface which increases the moisture absorption and retention characteristics of the meat and enhances product coherency.

Typically, tumbling is carried out by allowing meat products to fall from the upper part, e.g., of a rotating processing drum, or striking the meat products with paddles or baffles, thereby exerting "impact energy" influences on the muscle tissue of the meat. Massaging is a less physically vigorous activity involving the rubbing of meat surfaces against one another or against a smooth surface of a rotating drum to produce "frictional energy". Firm meat, e.g., beef, mutton and turkey, is usually tumbled whereas pork, chicken and other pale, soft meats are massaged.

Various apparatus for tumbling and massaging of meat and other food products have heretofore been devised. These prior art apparatus often employ rotating drums into which the meat products to be processed are inserted. In one such rotating drum processing apparatus, the axis of rotation for the drums may be inclined to varying degrees, with paddle or vane structures supplied when tumbling operations are to be carried out and smoother interior drum surfaces employed when more gentle massaging is called for. The curing fluid, e.g., brine, can be added to the drum, the drum sealed and mechanical tumbling or massaging initiated under atmospheric pressure conditions or, alternately, in a vacuum environment.

Temperature control during the tumbling and massaging operations is another factor of significance. For example, it is known that subjecting meat to low temperatures results in a greater release of myosin. Meat and poultry products which are massaged at lower temperatures therefore exhibit improved internal binding of water molecules. The quality of the meat obtained following subsequent cooking operations is higher, leading to less post-cook purge. Reduced processing temperatures also retard bacterial growth in the meat, improving quality control yields and extending the shelf life of the processed product.

Conversely, elevating temperatures during massaging and tumbling operations with some types of meat can assist in dehydrating the meat in preparation for cooking or can actually function to cook the meat products.

Any animal meat may be processed by the process of the present invention, for example, beef, pork, lamb, mutton, veal, poultry or game. The method is particularly valuable for hams.

Before being introduced into the continuous cooking tower, the meat is prepared into pieces of a size appropriate for the final product. After the meat has been introduced into the vessel, the vessel is heated by heat exchangers.

Any source of comminuted or small pieces of meat may be used as the source of meat. One particularly useful source is boneless, skinless, fat-free ham. The ham may be loaded from a dumping device to a bulk conveyor where it may be treated by a multi-needle pickle injector of conventional construction and operation. From here it may be fed by a feeding conveyor to a continuous tumbler of conventional construction and operation. The discharge from the continuous tumbler is to a discharge conveyor which feeds to a rubber screw feeding conveyor. The outflow from the screw conveyor, cured, uncooked ham chunks is fed to the continuous meat cooking tower of this invention.

The present invention is particularly useful in respect of cured boneless ham. In curing of ham (or any boneless meat for that matter), the preferred procedure is to pump a pickle solution (composed of sodium chloride (table salt), the sodium or potassium salt of nitrites, sweeteners, flavourings and the like) into the ham pieces. To help in the absorption and distribution of the curing solution throughout the meat tissue, the cured pieces of meat are subjected to a massaging or tumbling process. Such apparatus is constructed in the form of a stainless steel drum-shaped vessel, with flanges or paddles attached to the apparatus is mounted on machinery that rotates the chamber at speeds which can be varied as required. Many such massaging be massaged under vacuum. The ham meat so treated becomes suitably conditioned for use as feed material for the continuous cooking process of the invention.

The first step is considered to involve preheating the ham to an appropriate inside temperature. During this step there is no cooking. However, an important result is the addition of non-cooking heat units to the ham. This lowers the time later required to add heat units while cooking.

After the warming and flavouring period, the ham is ready to be cooked. A minimum of time is the objective to minimize purging. Other conditions are imposed to the same end. The first step is to cook the outside layers of the ham, thus to coagulate the protein to act as a seal against purging, and also to introduce heat units quickly and to push heat rapidly to the interior of the can. The extent to which the ham is thus quickly cooked is not too deep and therefore over-cooking at the surface is not a serious objection. The time of the total cooking is not greatly changed by a considerable variation in the temperature of the cooking step. The lower limit must be appreciably higher than the temperature of the next step.

The meat mixture which is filled into the tower is subjected to the action of an indirect heat exchangers at least partially to cook the meat and produce an initial set in the product. The meat may be heated to a suitable temperature for a sufficient length of time to produce the necessary preliminary cooking and initial setting of the comminuted meat product. To insure a proper cooking operation, the speed of the flow through the continuous meat cooking tower should be controlled. In this connection it is apparent that the cross-sectional shape of the optional horn may take any desired form.

It will of course be understood that the processing conditions in the various zones of the continuous meat cooking tower chamber will be determined by the nature of the food products to be treated. Food products may be cured, dried, tempered, smoked, chilled, etc., to give a few examples of the different types of processing conditions that may be used for different types of goods. The meat cooking tower is designed for the processing of meat and poultry products for the processed meat trade. All of these products are collectively described "meat products". Examples of these products are sausage of various kinds, hams, picnics, briskets, pork bellies, turkey and chicken rolls, pigs trotters. Various kinds of processed fish, e.g., smoked fish may also be processed in this way.

The heating by means of the indirect heat exchangers should be adequate to heat the comminuted meat to a temperature sufficient to produce a set in the meat. With a more rapid rate of passage of the meat through the heating zones, the temperature of the zones should be higher, while such lower temperatures can be used if the rate of flow of the product is reduced. Those skilled in the art can easily adjust the heating temperature and required residence time for the moving meat in the heating zone for a given indirect heat exchanger. Under proper temperature and time conditions, the product undergoes partial coagulation sufficient to impart to the meat a self-sustaining structure of sufficient strength to permit handling and subsequent operations including additional cooking, if required.

In preferred operation of the present invention, the preheating zone is placed at a temperature of about 4° to about 20° C. by brine or ethylene glycol from the final cooling zone. The brine or ethylene glycol is heated while the ham loaves are cooled.

The second preheating zone is placed at a temperature of about 20° C. to about 40° C. by water from the precooling zone. The water used for precooling is heated and provides the heat for the second preheating zone.

The precooling section is heated to a temperature of about 40° C. to about 65° C. by conventional industrial microwave cooling apparatus.

The temperature in the cooking section is brought to absorb 65° C. to about 75° C. by means of heating by steam in the heat exchanger. Optionally, complementary electrical and/or steam heating may also be used.

The precooling zone is cooled to a temperature of about 75° C. down to about 30° C. by cold water in the heat exchanger. The cold water is heated by such heat exchanger, and is used as a heat source in the heat exchanger at the second preheating zone.

The final precooling zone is cooled to a temperature of about 30° C. down to about 2° C. by brine or glycol. The brine or glycol is heated by such heat exchanger and is used as a heat source for the preheating zone.

The processing using the tower of this invention has several significant advantages over earlier forms of processing towers. In many earlier forms of processing chambers, an elongated length of tunnel-like structure was built, having a conveyor system passing through it which was moving continuously. The conveyor system was provided with hooks at spaced intervals, and individual products or quantities of products were hung from each hook, and moved continuously through the chamber. Since in order to process satisfactorily any particular product it was necessary that it remain in certain predetermined temperature conditions for a certain length of time, then either the conveyor was run extremely slowly, or else the chamber tunnel would have to be made of very great length. In addition to these obvious disadvantages of the prior art, however, the prior art type of chamber lead to inherent restrictions if the type of products that could be processed through it. In many cases the processor will wish to process one type of product for say a first shift of the day, and then switch over to a second shift. The two products may require different processing conditions or different dwell times.

Thus, it is ensured that in accordance with the objects of the invention, the thermal energy taken from the treatment material in the pre,cooling zone and transferred to the heat carrier in this zone is used for raising the temperature of the heat carrier in the preheating zone, i.e., a counter-current effect is obtained, by which a preheating of the treatment material is made possible in this zone without any additional energy supply. The heat transfer can be made more intense in that the supply of the heat carrier to the recooling zone and the transfer of the heat carrier removed from said zone into the preheating zone.

In order to provide the advantageous counter-current effect the inlet region has a side chamber receiving the heat exchange means, to which side chamber is connected to a circulating pump for removing the heated heat carrier and for supplying the same into the outlet region of the boiling zone and that the side chamber is connected to the inlet region of the boiling zone via an overflow. Thus, a temperature profile results in the boiling zone which has the highest temperature in the outlet region, so that the treatment material is subjected to a slowly increasing temperature effect.

In order to provide more efficient control in the treatment process, control means (not shown) may be provided for controlling the pumps providing the flow both of the coolants and of the steam. Also the flow rate and the means for speed of feeding the ham material may be controlled. The control may take place by performing a detection of the flow rate of the heat carrier, of the thermal energy supplied, of the inlet and outlet temperatures of the heat carrier in the heat exchangers and of the speed of the means for conveying the hams to be treated. The data obtained thereby may be supplied as process data to a computer, which controls the treatment process in accordance with a predetermined optimization program with regard to minimizing the operating costs, use being made of a predetermined reference value for the temperature difference in the boiling bath and/or the throughput represented by the speed of the means for conveying the foodstuffs to be treated as orientation parameters.

During the cooking process, it has been found advantageous to exert a continuous pressure on the meat piece to prevent the formation of air pockets as well as to obtain a more uniform meat density.

As compared with prior methods, the present apparatus will save labour, and heat energy, and the products will be of a more uniform quality and be better processed than with conventional systems. The taller the dimensioning of the apparatus, the better it will operate. This factor is also of importance because of the reduced horizontal space required.

Conclusion

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. Vertically-upright processing apparatus for the continuous processing of food products comprising:
   (a) an indirect preheating heat exchanger surrounding an upper zone of said apparatus, said preheating heat exchanger having a preheating fluid inlet and a preheating fluid outlet;
   (b) an indirect cooking heat exchanger surrounding an intermediate zone of said apparatus, said indirect cooking heat exchanger having a cooking fluid inlet and a cooking fluid outlet; and (c) an indirect cooling heat exchanger surrounding a bottom zone of said apparatus, said indirect cooling heat exchanger having an indirect cooling fluid inlet and an indirect cooling fluid outlet, said indirect cooling fluid outlet being connected to said preheating fluid inlet of said preheating heat exchanger.

2. A continuous cooking apparatus comprising:
(a) a vertically-upright processing chamber;
(b) a first indirect heating heat exchanger surrounding a top zone of said processing chamber, said first indirect heating heat exchanger having a first heating medium inlet and a first heating medium outlet;
(c) a second indirect heating heat exchanger surrounding an upper zone of said processing chamber, said upper zone abutting and being below said top zone, said second indirect heat exchanger having a second heating medium inlet and a second heating medium outlet;
(d) a third indirect heating heat exchanger surrounding an intermediate pre-cooking zone of said processing chamber, said intermediate pre-cooking zone abutting and being below said upper zone, said third indirect heating heat exchanger having a third heating medium inlet and a third heating medium outlet;
(e) a first indirect cooling heat exchanger surrounding a lower zone of said processing chamber, said lower zone abutting and being below said intermediate pre-cooking zone, said first indirect cooling heat exchanger having a first cooling medium inlet and a first cooling medium outlet, said first cooling medium outlet being connected to said second heating medium inlet at said upper zone; and
(f) a second indirect cooling heat exchanger surrounding a bottom zone of said processing chamber, said bottom zone abutting and being below said lower zone, said second indirect cooling heat exchanger having a second cooling medium inlet and a second cooling medium outlet, said second cooling medium outlet being connected to said first heating medium inlet of said first indirect heating heat exchanger.

3. The apparatus of claim 2 including a microwave cooking apparatus at said intermediate pre-cooking zone.

4. The apparatus of claim 2 including complementary electrical heating means at said intermediate pre-cooking zone.

5. The apparatus of claim 2 including complementary electrical heating means at said intermediate pre-cooking zone and also complementary steam heating at said intermediate pre-cooking zone.

6. The apparatus of claim 2 including an extrusion device to feed product to be cooked into said chamber.

7. The apparatus of claim 2 including a screw pushing device to feed products to be cooked into said chamber.

8. The apparatus of claim 2 including a paddle-type pushing device to feed products to be cooked into said chamber.

9. The apparatus of claim 2 including severing means to cut cooked products emerging from said processing apparatus to a predetermined length.

10. The apparatus of claim 9 wherein said severing means comprises a guillotine knife.

11. The apparatus of claim 9 including a conveyor to move predetermined length-cooked products to a packaging station.

12. The apparatus of claim 2 wherein the cross-section of said chamber is round, square or rectangular.

13. The apparatus of claim 12 including a plurality of vertically-upright processing chambers.

14. A continuous process for cooking proteinaceous food in a vertically-upright processing tower, including the steps of continuously feeding said proteinaceous food downwardly in said tower through a plurality of contiguous sections, comprising:
(a) feeding said proteinaceous food through a first preheating section of said tower, where it is preheated from a temperature of about 4° C. to a temperature of about 40° C. by indirect heat exchange using influent preheating heat exchange medium and providing effluent preheating heat exchange medium, thereby to provide preheated proteinaceous food;
(b) feeding said preheated proteinaceous food through a cooking section of said tower, where said preheated proteinaceous food is cooked from a temperature of about 40° C. to a temperature of about 75° C. by indirect heating heat exchange using influent cooking heat exchange medium and providing effluent cooking heat exchange medium, thereby to provide cooked proteinaceous food; and
(c) feeding said cooked proteinaceous food through a cooling section of said tower where it is cooled from a temperature of about 75° C. to a temperature of about 2° C. by indirect cooling heat exchange using influent cooling heat exchange medium and providing effluent cooling heat exchange medium, thereby to provide cooled, cooked proteinaceous food.

15. The process of claim 14 wherein influent preheating indirect heat exchange medium which provides heat for said preheating step (a) is effluent cooling heat exchange medium from said indirect cooling heat exchange recited in step (c).

16. The process of claim 15 wherein said preheating influent heat exchange medium is brine or glycol.

17. The process of claim 14 wherein said cooling section of said tower includes an upper abutting pre-cooling section wherein cooked proteinaceous food is cooled from a temperature of about 75° C. to a temperature of about 30° C. by indirect cooling heat exchange.

18. The process of claim 17 wherein said cooling influent heat exchange medium is brine or glycol.

19. The process of claim 14 wherein said cooking section includes a precooking section where said preheated proteinaceous food is heated from a temperature of about 40° C. to a temperature of about 65° C. by microwave heating.

20. The process of claim 14 wherein said first preheating section also includes a second preheating section where preheated proteinaceous food is preheated from a temperature of about 20° C. to a temperature of about 40° C.

21. The process of claim 14 wherein said cooling section includes an upper abutting pre-cooling section wherein said cooked proteinaceous food is cooled from a temperature of about 75° C. to a temperature of about 30° C. by indirect cooling heat exchange, and wherein said first preheating section includes a second preheating section where said preheated proteinaceous food is preheated from a temperature of about 20° C. to a temperature of about 40° C.

22. The process of claim 21 wherein effluent cooling heat exchange medium from said pre-cooling section constitutes influent preheating heat exchange medium for said first preheating section.

23. The process of claim 14 wherein cooking in said cooking section is abetted by at least one of complementary electrical and steam heating from a temperature of about 65° C. to a temperature of about 75° C.

24. The process of claim 14 including the step of forcing food products to be cooked into said vertically-upright processing tower.

25. The process of claim 14 includes the step of cutting said cooled cooked proteinaceous food emerging from said processing apparatus into predetermined lengths.

26. A continuous ham cooking procedure comprising:
 (a) dumping boneless, skinless, substantially fat-free hams into a bulk conveyor;
 (b) conveying said hams to a multi-needle pickle injector;
 (c) feeding said hams from said multi-needle pickle injector to a continuous tumbler;
 (d) feeding said hams from said continuous tumbler to a feeding rubber screw conveyor; and
 (e) continuously feeding said hams to a vertically-upright processing apparatus, said hams being fed downwardly in said processing apparatus to produce cooled cooked hams, said processing apparatus comprising:
  (1) an indirect preheating heat exchanger surrounding an upper zone of said apparatus, said preheating heat exchanger having a preheating fluid inlet and a preheating fluid outlet;
  (2) an indirect cooking heat exchanger surrounding an intermediate zone of said apparatus, said indirect cooking heat exchanger having a cooking fluid inlet and a cooking fluid outlet; and
  (3) an indirect cooling heat exchanger surrounding a bottom zone of said apparatus, said indirect cooling heat exchanger having an indirect cooling fluid inlet and an indirect cooling fluid outlet, said indirect cooling fluid outlet being connected to said preheating fluid inlet of said preheating heat exchanger.

* * * * *